United States Patent
Trombley et al.

(10) Patent No.: US 11,288,425 B1
(45) Date of Patent: Mar. 29, 2022

(54) PATH-BASED TIMING DRIVEN PLACEMENT USING ITERATIVE PSEUDO NETLIST CHANGES

(71) Applicant: International Business Machines Corporation, Armonk, NY (US)

(72) Inventors: Benjamin Neil Trombley, Hopewell Junction, NY (US); Nathaniel Douglas Hieter, Clinton Corners, NY (US); Daniel Arthur Gay, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/124,429

(22) Filed: Dec. 16, 2020

(51) Int. Cl.
*G06F 30/327* (2020.01)
*G06F 30/392* (2020.01)
*G06F 30/3312* (2020.01)
*G06F 119/12* (2020.01)

(52) U.S. Cl.
CPC ........ *G06F 30/327* (2020.01); *G06F 30/3312* (2020.01); *G06F 30/392* (2020.01); *G06F 2119/12* (2020.01)

(58) Field of Classification Search
USPC ........................................................ 716/101
See application file for complete search history.

(56) References Cited

U.S. PATENT DOCUMENTS

| | | | |
|---|---|---|---|
| 9,251,306 B2 | 2/2016 | Kim | |
| 2002/0116685 A1* | 8/2002 | van Ginneken | G06F 30/392 716/113 |
| 2007/0150846 A1* | 6/2007 | Furnish | G06F 30/392 716/122 |
| 2008/0216038 A1* | 9/2008 | Bose | G06F 30/392 716/118 |
| 2009/0254874 A1* | 10/2009 | Bose | G06F 30/39 716/113 |
| 2010/0146472 A1* | 6/2010 | Srivastava | G06F 30/394 716/129 |
| 2010/0257498 A1* | 10/2010 | Alpert | G06F 30/327 716/113 |

OTHER PUBLICATIONS

"Method and Apparatus for Improving Wirelength and Frequency in Circuit Design," IPCOM000244046D, IP.com, Nov. 9, 2015, 42 pages plus cover sheet.

(Continued)

*Primary Examiner* — Mohammed Alam
(74) *Attorney, Agent, or Firm* — Erik Johnson; Otterstedt, Wallace & Kammer, LLP

(57) ABSTRACT

Carry out an initial wire-length-driven placement for an integrated circuit design embodied in an unplaced netlist, using a computerized placer, to obtain a data structure representing initial placements of logic gates. Identify at least one timing-critical source-sink path between at least one pair of source-sink endpoints in the data structure representing the initial placements. Create a new pseudo two-pin net for each pair of the at least one pair of source-sink endpoints to create an updated netlist. Carry out a revised wire-length-driven placement on the updated netlist to obtain a data structure representing revised placements.

25 Claims, 15 Drawing Sheets

(56) References Cited

OTHER PUBLICATIONS

Ajami, Amir H, et al. "Post-Layout Timing-Driven Cell Placement using an Accurate Net Length Model with Movable Steiner Points." Proceedings of the 2001 Asia and South Pacific Design Automation Conference, 2001, 6 pages.

Ren, Haoxing, et al. "Sensitivity guided net weighting for placement-driven synthesis". IEEE Transactions on Computer-Aided Design of Integrated Circuits and Systems, Apr. 25, 2005; 24(5):711-21.

Chentouf, Mohamed, et al. "A Novel Net Weighting Algorithm for Power and Timing-Driven Placement, VLSI Design". Oct. 18, 2018 pp. 1-9 Plus Endpiece.

Goplen, Brent, et al. "Net weighting to reduce repeater counts during placement". In Proceedings 42nd Design Automation Conference, 2005, Jun. 13, 2005 (pp. 503-508), IEEE.

Pawan Gandhi et al., "Hierarchical Timing Analysis: Pros, Cons, and a New Approach". Cadence White Paper 2020 7 Pages.

Synopsys White Paper, Lower Process Nodes Drive Timing Signoff Software Evolution, Jul. 2020 pp. 1-5.

Hou, Wenting, et al. "A path-based timing-driven quadratic placement algorithm." Proceedings of the 2003 Asia and South Pacific Design Automation Conference. 2003. pp. 1-4.

Marquardt A, Betz V, Rose J. Timing-driven placement for FPGAs. InProceedings of the 2000 ACM/SIGDA eighth international symposium on Field programmable gate arrays Feb. 1, 2000 (pp. 203-213).

\* cited by examiner

PATH-BASED TIMING DRIVEN PLACEMENT USING ITERATIVE PSEUDO NETLIST CHANGES

BACKGROUND

The present invention relates to the electrical, electronic, and computer arts, and more specifically, to semiconductor Electronic Design Automation (EDA) and the like.

EDA involves the use of software tools for designing electronic systems such as integrated circuits (ICs) and printed circuit boards. Generally, ICs have data signals and a clock; the data signal needs to reach a certain node at the correct time vis-a-vis the time when the corresponding clock cycles the device at that node. If the data signal does not arrive in time, the clock is too fast, or alternatively, the data signal is taking too long to propagate (path is too slow).

Currently, half-perimeter wire length (HPWL) techniques are used for placement within the EDA process. However, HPWL is not timing aware, such that an IC design developed using HPWL techniques may not satisfy timing constraints. Previous attempts to address the problem of HPWL not being timing aware have been excessively computationally intensive, limited by the quality of global placement and/or accuracy of timing analysis, vulnerable to saturation, and/or prone to creating tortuous paths between sources and sinks.

SUMMARY

Principles of the invention provide techniques for path-based timing driven placement using iterative pseudo netlist changes. In one aspect, an exemplary method for improving the timing performance of electronic circuits designed using electronic design automation includes carrying out an initial wire-length-driven placement for an integrated circuit design embodied in an unplaced netlist, using a computerized placer, to obtain a data structure representing initial placements of logic gates; identifying at least one timing-critical source-sink path between at least one pair of source-sink endpoints in the data structure representing the initial placements; creating a new pseudo two-pin net for each pair of the at least one pair of source-sink endpoints to create an updated netlist; and carrying out a revised wire-length-driven placement on the updated netlist to obtain a data structure representing revised placements.

In one or more embodiments, the at least one timing-critical source sink path includes a plurality of timing-critical source-sink paths and the at least one pair of source-sink endpoints includes a plurality of pairs of source-sink endpoints; the steps of identifying the plurality of timing-critical source-sink paths, creating the new pseudo two-pin net for each pair of the plurality of pairs of endpoints, and carrying out the revised wire-length-driven placement are repeated for a plurality of total iterations.

Carrying out the initial wire-length-driven placement and carrying out the revised wire-length-driven placement each include, for example, applying a half-perimeter wire length-driven placement, and the computerized placer includes a half-perimeter wire length-driven computerized placer.

In another aspect, an exemplary computer includes a memory; and at least one processor, coupled to the memory, and operative to improve the timing performance of electronic circuits designed using electronic design automation by: carrying out an initial wire-length-driven placement for an integrated circuit design embodied in an unplaced netlist, using a computerized placer, to obtain a data structure representing initial placements of logic gates; identifying at least one timing-critical source-sink path between at least one pair of source-sink endpoints in the data structure representing the initial placements; creating a new pseudo two-pin net for each pair of the at least one pair of source-sink endpoints to create an updated netlist; and carrying out a revised wire-length-driven placement on the updated netlist to obtain a data structure representing revised placements.

In still another aspect, an exemplary method for improving the timing performance of electronic circuits designed using electronic design automation includes obtaining, from a computerized placer, results of an initial wire-length-driven placement for an integrated circuit design embodied in an unplaced netlist, the results including a data structure representing initial placements of logic gates; obtaining, from a computerized timer, at least one timing-critical source-sink path between at least one pair of source-sink endpoints in the data structure representing the initial placements; creating a new pseudo two-pin net for each pair of the at least one pair of source-sink endpoints to create an updated netlist; and providing the updated netlist to the computerized placer to facilitate the computerized placer carrying out a revised wire-length-driven placement on the updated netlist to produce a data structure representing revised placements.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention provide substantial beneficial technical effects. For example, embodiments as described in this summary section provide the following benefits:

chips designed using aspects of the invention are superior (e.g., better timing compliance) as compared to chips designed using prior art techniques;

a computer running EDA using aspects of the invention obtains superior results as compared to the prior art while in at least some instances using fewer resources (CPU, memory, or the like) as compared to the prior art.

These and other features and advantages of the present invention will become apparent from the following detailed description of illustrative embodiments thereof, which is to be read in connection with the accompanying drawings.

DETAILED DESCRIPTION

Figure 1:
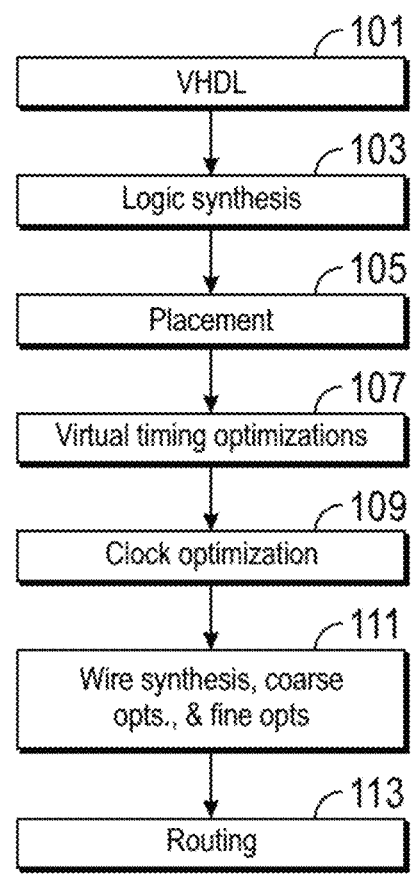
FIG. 1 is a block diagram of an EDA process wherein aspects of the invention can be employed for placement.

FIG. 1 shows a physical synthesis flow process, as used in semiconductor design. In step 101, a putative design is rendered in a hardware description language such as VHDL. In step 103, carry out logic synthesis to convert from the hardware description language to actual interconnected logic gates. In step 105, carry out initial (global) placement; i.e., translate an abstract description of hardware (interconnected logic gates) into something that can be laid out on a chip. In step 107, carry out virtual timing optimizations. In step 109, carry out clock optimization. In step 111, carry out wire synthesis, course optimization, and fine optimization. In step 113, carry out routing.

Figure 2:
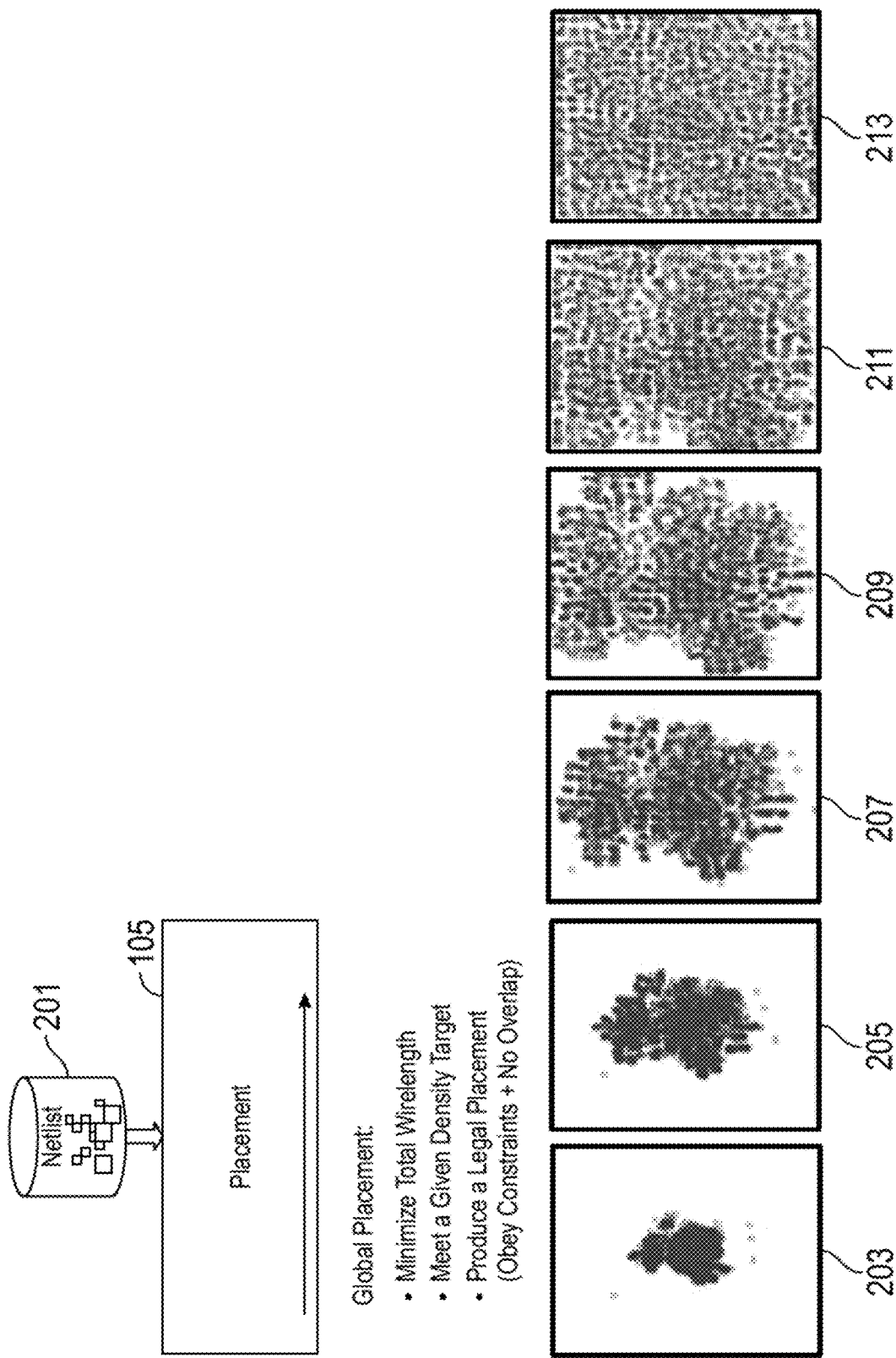
FIG. 2 shows global placement, in accordance with aspects of the invention.

FIG. 2 shows progression of a global placement process starting with netlist 201. Initially, minimize total wire length, which results in the "cramped" placement at 203. To meet a given density target, gradually "spread" the placement as seen at 205, 207, 209, 211, eventually producing a legal placement 213 which obeys constraints and does not have any overlap.

Figure 3:
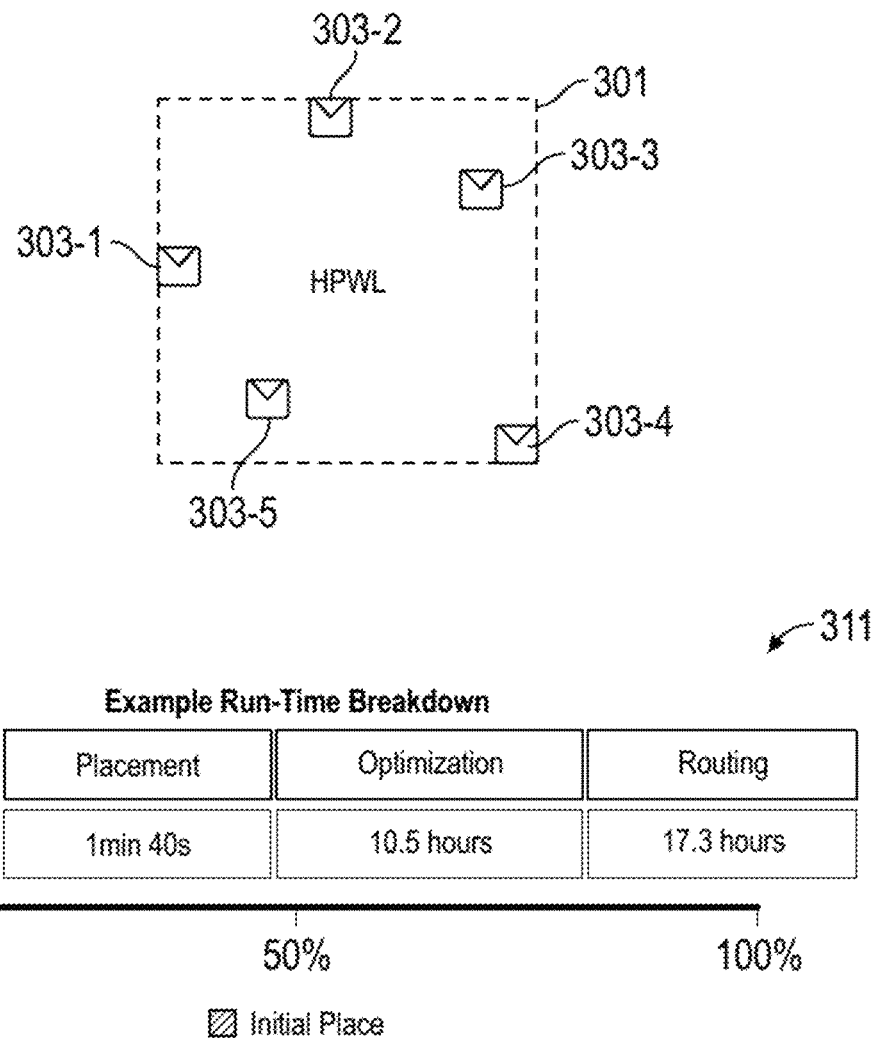
FIG. 3 shows aspects of half perimeter wire length placement, which can be enhanced in accordance with aspects of the invention.

One or more embodiments are useful, by way of example and not limitation, during global placement step 105 and/or clock optimization 109. Attention to producing a good global placement in step 105 generally pays off with a good final result from the physical synthesis flow process. Indeed, physical synthesis capability to meet timing closure is bound by the global placement. Traditional global placement algorithms are linear optimizations which are connectivity driven (employing half-perimeter wirelength "HPWL"). Referring to FIG. 3, in the HPWL approach, wirelength is approximated by half the perimeter of the smallest bounding rectangle 301 that encloses all terminals 303-1, 303-2, 303-3, 303-4, 303-5 in the net. State of the art HPWL minimization uses force-directed placement. Better global placement HPWL solutions (meeting the same density/congestion constraints) often mean better physical synthesis results. HPWL placement also has the benefit of being relatively fast. Table 311 of FIG. 3 shows an exemplary run-time breakdown for a physical synthesis flow process. The placement portion consumes only 1 minute and 40 seconds of run time, while the optimization portion requires 10.5 hours and the routing portion requires 17.3 hours.

As will be appreciated by the skilled artisan, some paths in a circuit layout are typically more timing-critical than others; i.e., keeping signal propagation times down in those paths is needed in order for the circuit to be able to operate successfully at a desired clock frequency. However, HPWL is not timing aware. For complex, high performance logic macros, this can lead to placement solutions where physical synthesis is insufficient to meet a cycle time constraint.

Many attempts and techniques have been used to deal with this limitation of HPWL; each has benefits and drawbacks. In net weight driven placers, high net weight gives preferential treatment to timing critical nets, with the benefit of providing HPWL optimization with timing information. However, this approach saturates quickly, is too aggressive for high-fanout nets, relies too much on accurate timing, and exhibits behavior wherein fixing one issue may cause another. Hypergraph placements based on memory elements (e.g., flip-flops) help balance distance between timing endpoints. However, this approach often creates congestion problems and may result in meandering paths of combinatorial logic, wherein the endpoints are close yet the path is long. Critical path straightening algorithms are employed after global placement has taken place once and critical paths can be identified; it is powerful at reducing the distance traveled by signals between timing endpoints, but is bound by the quality of the global placement solution. Timing models implemented inside the placement procedure (path based) are mathematically interesting, but are prohibitively CPU intensive, and overly bound by the yet-to-be-optimized netlist.

One or more embodiments advantageously provide a global placement technique which provide timing information to the HPWL placer; places timing endpoints (i.e., endpoints of timing-critical paths) closer together; and/or straightens critical paths, via path-based timing driven placement using iterative pseudo netlist changes (also referred to herein as timing driven attractions (TDA)). A pseudo netlist change, also referred to herein as an "attraction," is a "fake" ("pseudo") two pin net from a sink to a source that is created only inside the HPWL model. The exemplary approach is timing-driven in the sense that the worst "paths" (source timing endpoint to sink timing endpoints) are chosen based on a timing estimation, and attractions are threaded along those worst paths (each source/sink pair receives an attraction). The exemplary approach is implemented into the placer, for example, by re-running the global placement with the new attractions (i.e., a new Netlist wherein the attractions have been added). The exemplary approach is iterative, for example, in the sense that multiple global placements are run, incrementally creating more attractions and/or increasing the weights of previous attractions.

Figure 4:
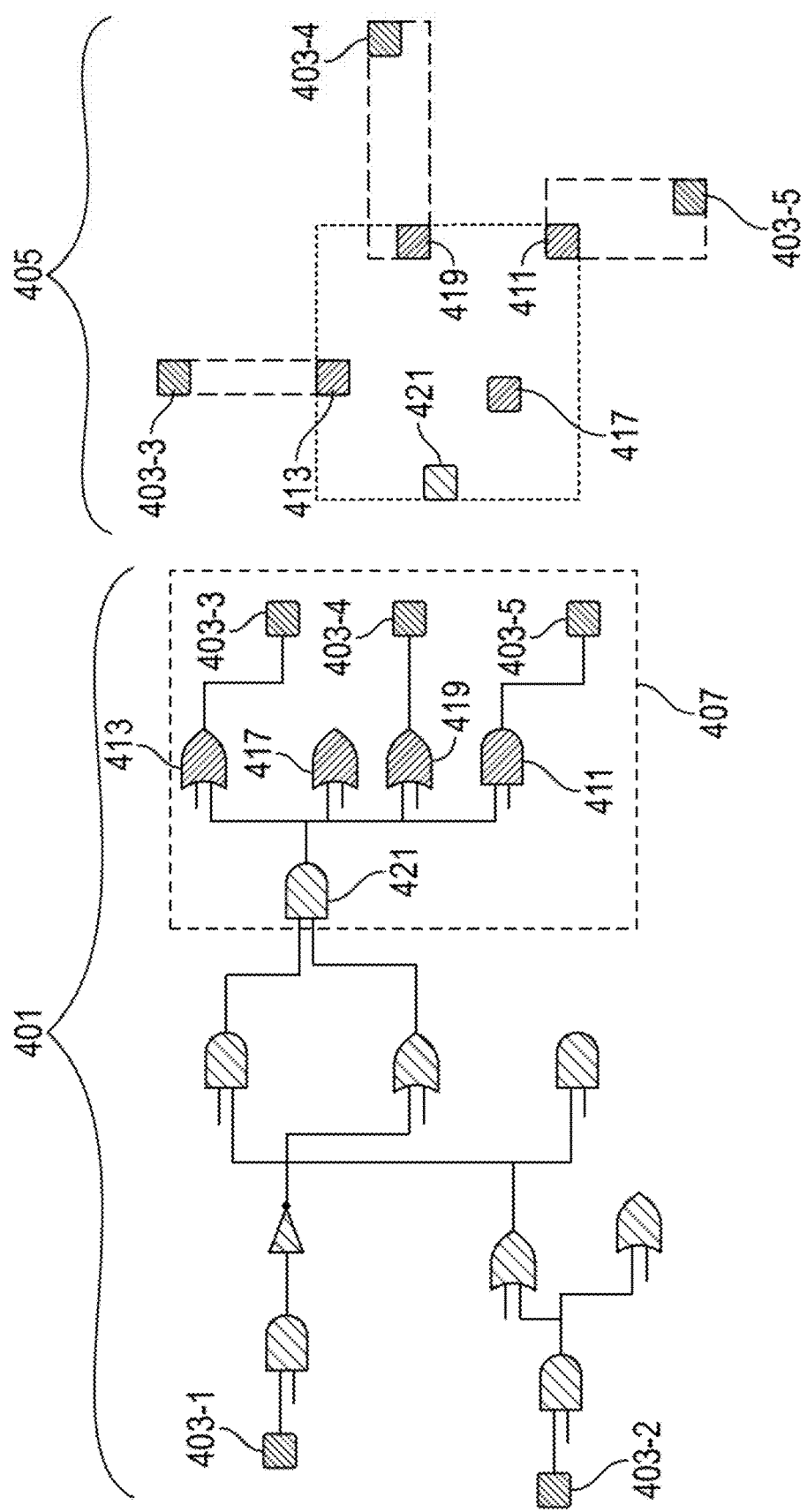
FIGS. 4, 5, and 6 show timing driven attractions (TDA), in accordance with aspects of the invention.

View 401 of FIG. 4 is a logic diagram showing examples of timing driven attractions (TDAs) according to aspects of the invention, for an exemplary subset of a netlist. The rectangles 403-1, 403-2, 403-3, 403-4, 403-5 are the timing endpoints and the view 405 on the right represents a physical layout (with actual placements; i.e., represented by a physical HPWL model) corresponding to the elements within dashed box 407 of view 401. There are a plurality of logic gates; to avoid clutter, only AND gates 421 and 411, and OR gates 413, 417, 419 are numbered.

Figure 5:
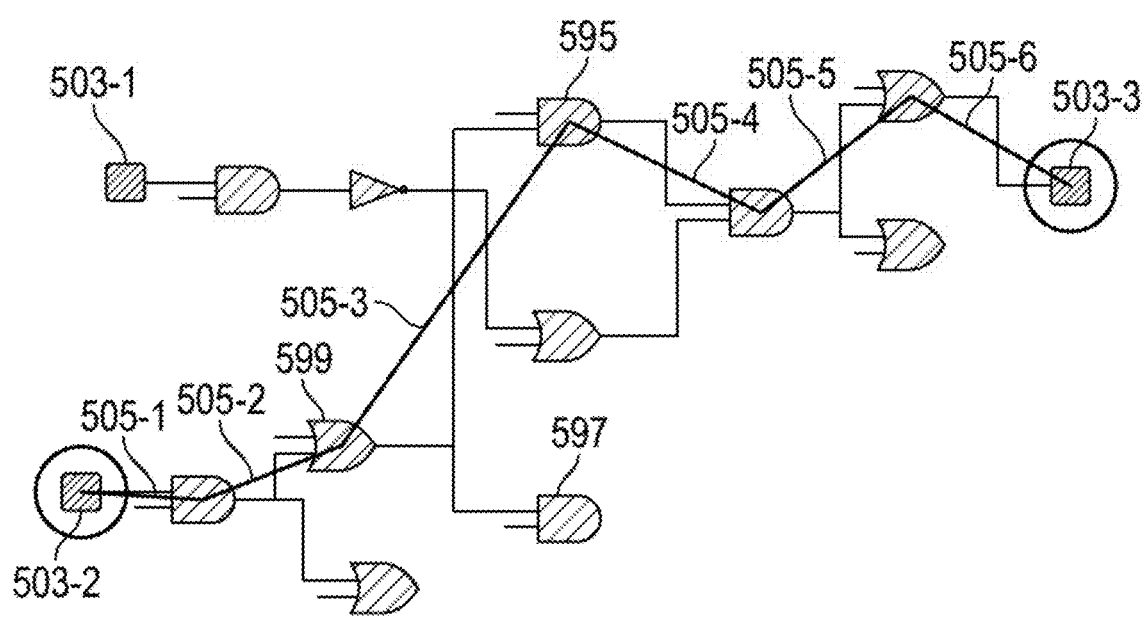

FIG. 5 shows a logic diagram with three timing endpoints 503-1, 503-2, and 503-3; 503-2 and 503-3 are determined to be the worst endpoints. The bold lines 505-1, 505-2, 505-3, 505-4, 505-5, 505-6 interconnecting endpoints 503-1, 503-3 through various logic gates (not all of which are separately numbered, to avoid clutter) represent the attractions. Note that OR gate 599 has an output to AND gate 597 and another output to AND gate 595, but only the output from 599 to 595 receives an attraction because only that output is on the critical path. Thus, select the most timing critical begin/endpoint pairs, create new attractions in the netlist, and iterate on global placement.

Figure 6:
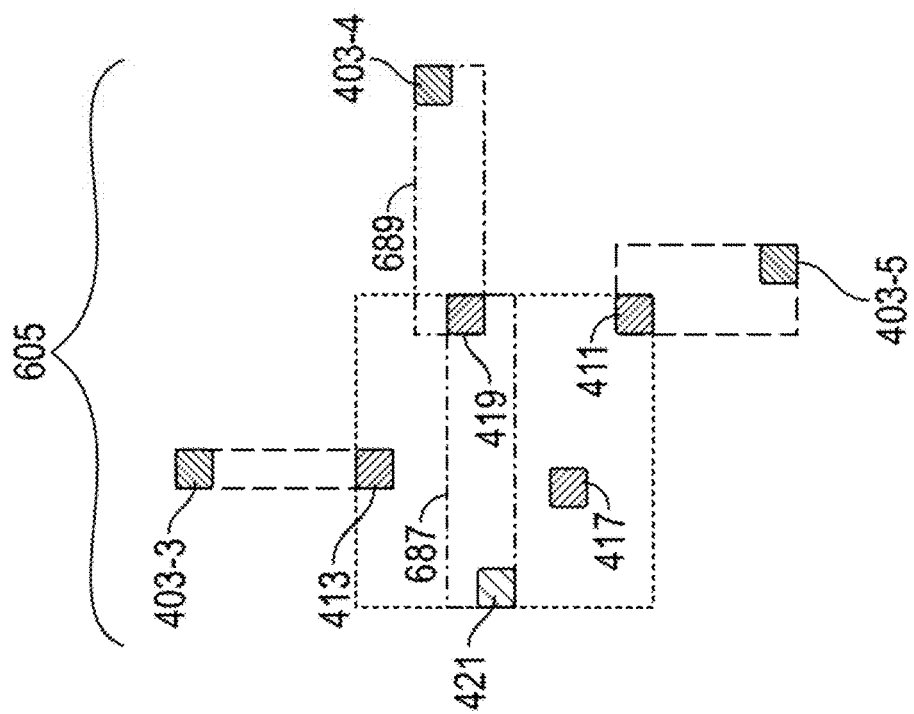
Figure 6:
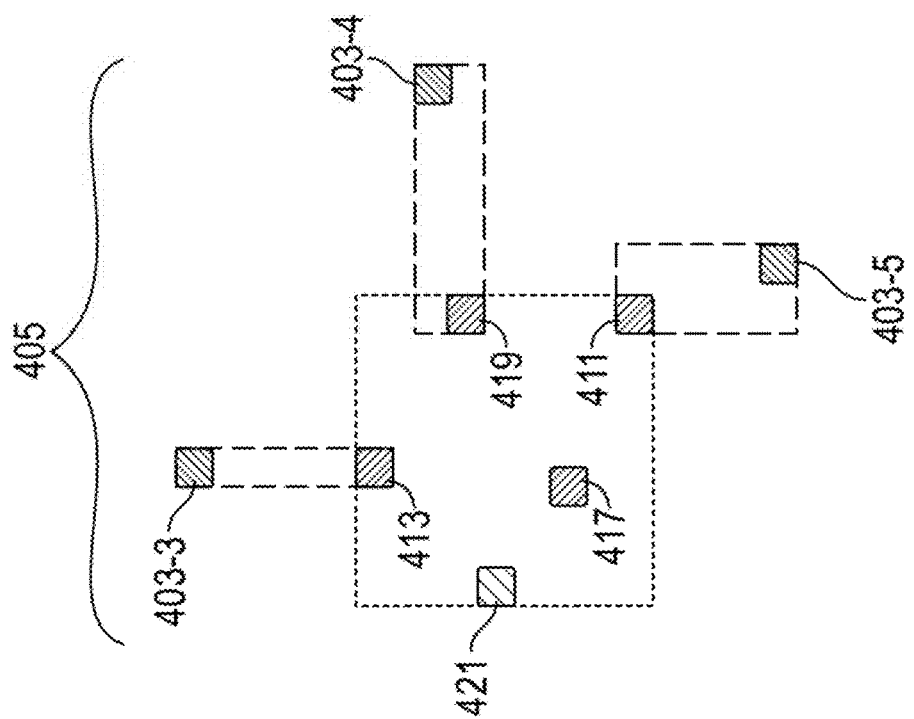

FIG. 6 reproduces view 405 from FIG. 4 (default model for NHP driven placement) and adds new view 605 showing the addition of attractions 687, 689 (model with critical source to sink pairs as a net). In view 405 without attraction 687, there is no motivation for gate 419 to move closer to source 421 because the dashed bounding box (and thus HPWL) will not change. However, the addition of attractions 687, 689 in view 605 motivates moving elements 421, 419, and 403-4 closer together.

Figure 7:
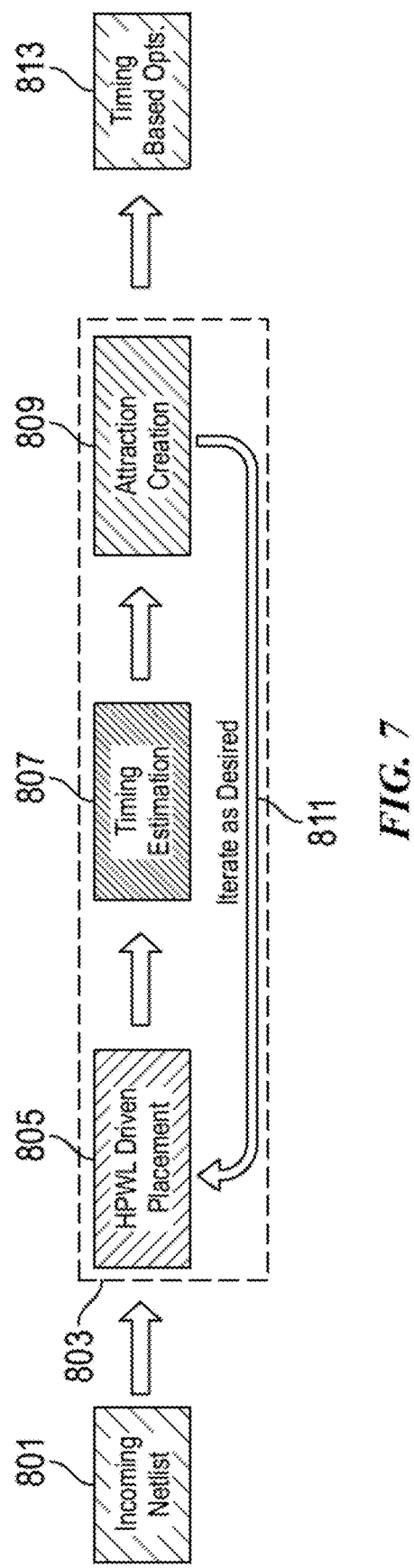
FIGS. 7 and 8 are flow charts, in accordance with aspects of the invention.

Refer now to the flow chart of FIG. 7, which depicts a placement flow employing TDA according to aspects of the invention. There is an incoming netlist 801 with no placements. In step 805, carry out HPWL-driven placement using any currently-known or hereafter-developed HPWL based placement algorithm. In step 807, carry out timing estimation. Advantageously, in one or more embodiments, the timing estimation does not need to be accurate in an absolute sense (which is advantageous because it is hard to obtain accurate timing, in an absolute sense, early in the synthesis flow), only relatively accurate (i.e., able to determine what paths are most critical to facilitate inserting attractions, but don't need to know how many picoseconds they are failing by). Furthermore, one or more embodiments can be employed using any currently-known or hereafter-developed timer (program implementing timing) (advantageously allowing the technique to adapt easily to improved timing estimation methods). One or more embodiments employ a combination of buffer estimation and reasonable metal layer assumptions.

In step 809, carry out attraction creations as described. As indicated by dashed box 803 and arrow 811, steps 805, 807, and 809 are repeated in an iterative manner. In each iteration, all the attractions are treated equally; i.e., they are all just new nets. It is only desired to "nudge" critical paths straight and endpoints closer. From iteration to iteration, all previous attractions are retained in one or more embodiments. Thus, paths that have been improved maintain the HPWL force that improved them, and repeat offending paths can be improved further (i.e., given higher priority). When done iterating, proceed to timing-based optimization 813.

Figure 8:
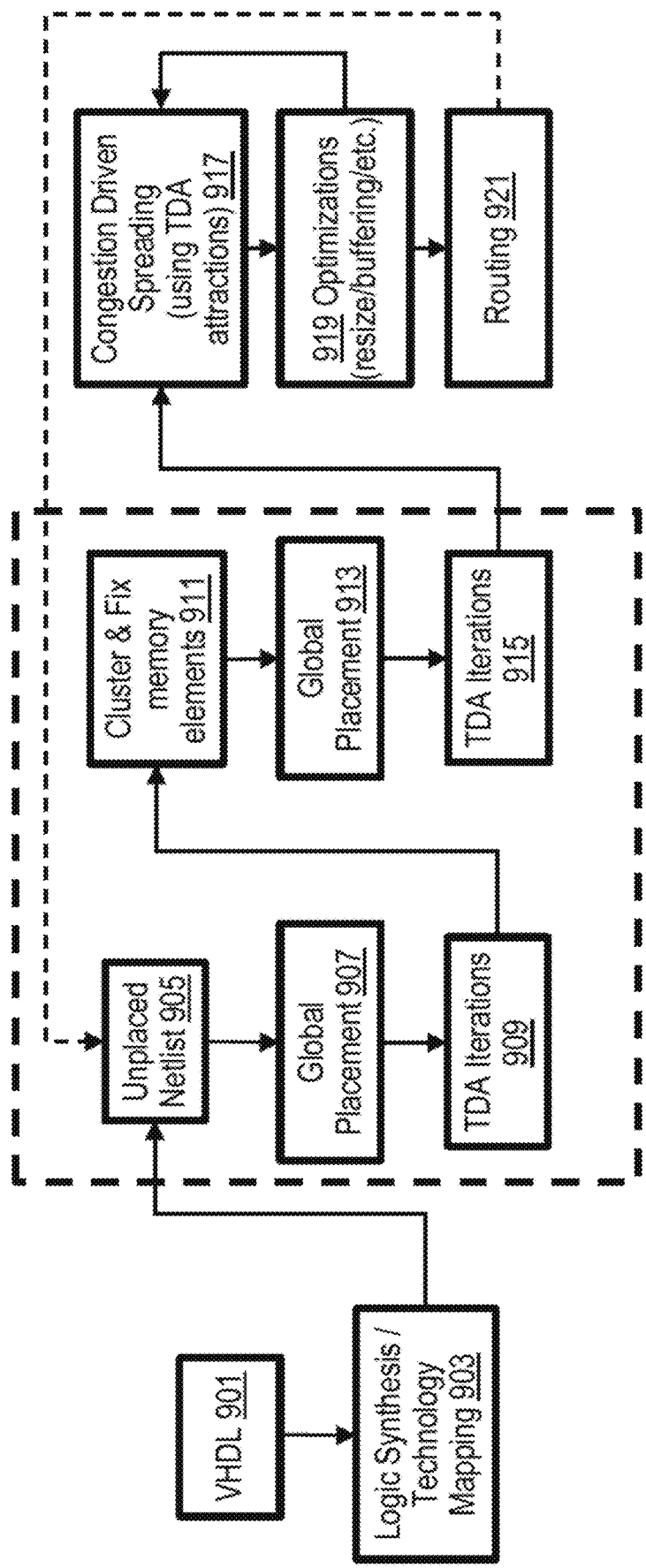

FIG. 8 gives an example of TDA usage in physical design closure flow. One or more embodiments proceed from hardware description language (e.g. VHDL 901) through the gates (logic synthesis 903 to unplaced netlist 905), and are re-usable in the sense that they can be used for (first) global placement 907 and proceed through the TDA iterations 909, and then later on in the flow, memory elements can be clustered and fixed (so they are no longer movable) at 911, and then the remaining circuit elements (other than the fixed memory elements) can be optimized by repeating placement 913 and TDA 915 to reduce and straighten other critical paths. At later stages of the physical synthesis flow, once a certain amount of optimization has been done, gates in areas that are hard to route can be spread out at 917, using TDA attractions. Advantageously, many challenging, complex algorithms during the steps in the dashed box can be completely replaced by the TDA placement. Following step 917, additional optimizations can be carried out at 919 and routing can be carried out at 921.

Advantageously, one or more embodiments employing TDA, compared to a net weight driven placer, add new nets as opposed to simply adjusting the weights of existing nets. Compared to a prior-art latch gate technique, one or more embodiments employing TDA provide the ability to pull endpoints closer without stripping any of the combinatorial logic out of the placement model, because the actual Netlist is adjusted. Critical path straightening algorithms are undertaken as a "fix-up" optimization following global placement, whereas one or more embodiments employing TDA are effectively a global operation as opposed to a fix-up optimization. Also, one or more embodiments employing TDA do not look to specifically straighten critical paths or at their existing straightness; rather, straighter paths are just a natural result of one or more embodiments employing TDA. One or more embodiments employing TDA use standard wire length and density/congestion objective functions of placers, and use timing only to adjust the placement netlist model, as opposed to requiring a timing model inside the placer.

Figure 9:
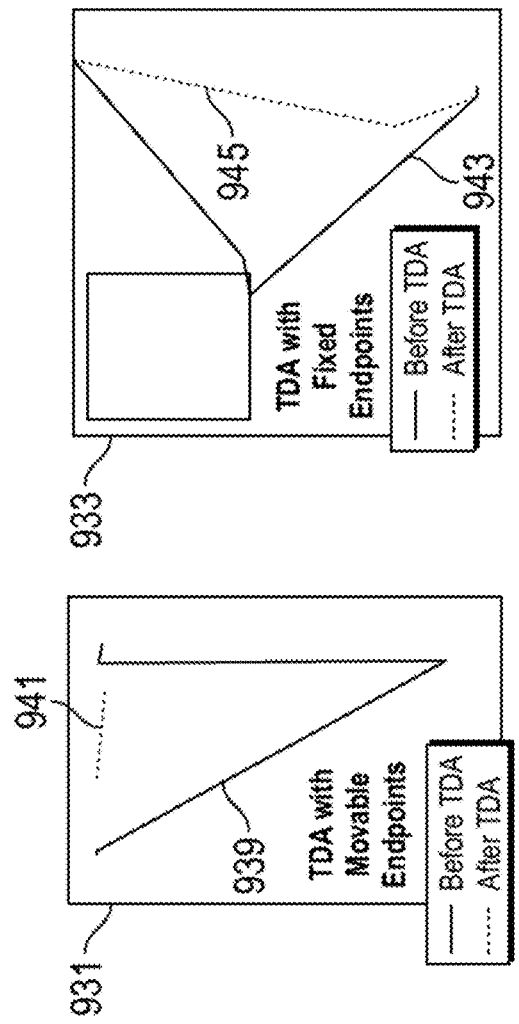
FIG. 9 shows exemplary experimental results.
Figure 9:
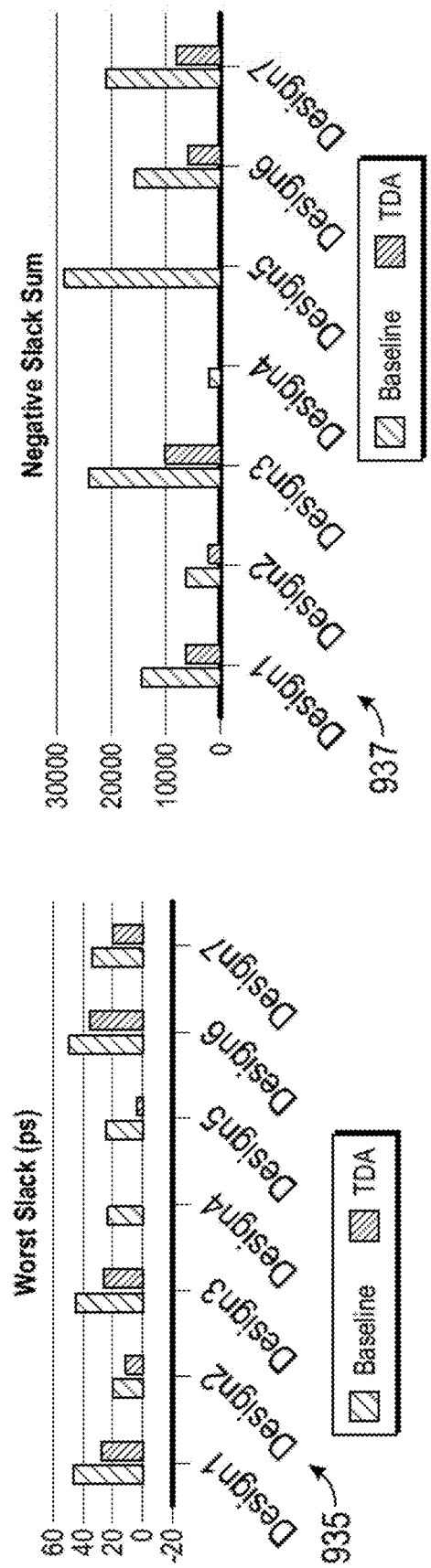

Referring to FIG. 9, one or more embodiments provide: significant improvement in worst slack and total negative slack (figure of merit=FOM) output of physical synthesis; and/or the ability to replace many complex fix-up placement algorithms. Note that one or more embodiments typically produce a somewhat worse HPWL, even though there are over-all improvements. View 931 shows a path 939 before TDA (with movable endpoints) and a path 941 after TDA. View 933 shows a path 943 before TDA (with fixed endpoints) and a path 945 after TDA. Views 935, 937 show bar graphs of worst slack (ps) and negative slack sum for experimental results for seven different example timing-challenged designs (comparing a baseline to results using TDA).

Given the discussion herein, the skilled artisan will appreciate that one or more embodiments enable timing driven placement to be produced using the TDA technique, which includes, in one or more embodiments, selecting critical begin/endpoint pairs (using any type of timing estimation); adding "fake" two-pin nets to the netlist on all sink→source pairs between these identified endpoints; and running placement using (any wirelength driven placer). One or more embodiments further perform these steps iteratively.

In one or more embodiments, to select critical begin/endpoint pairs (using any timing estimation): carry out a timing simulation wherein arrival times (Ats) and required arrival times (RATs) propagate forward and backward through the network (net) from memory elements, to obtain slack values (AT minus RAT) at every sink pin of a net. Knowing the slacks at those sink pins helps determine the critical two-pin connections (i.e., between pertinent endpoints).

Advantageously, one or more embodiments can be run with any wirelength-driven placer and with any timing estimation technique. Further, one or more embodiments can be readily expanded to N+1 synthesis, wherein the worst results from previous physical synthesis flow runs are automatically chosen as the worst endpoints. That is to say, in some instances, timing information at the point of placement is not necessarily needed; it can be from a previous run. Further, one or more embodiments are expandable beyond fitting into physical synthesis flow. For example, see FIG. 8, showing TDA employed at a variety of points in the design/synthesis process; e.g., 909, 915, and within 917. In one or more embodiments, a data flow can be provided between routing 921 and unplaced netlist 905; i.e., the whole flow in FIG. 8 can be traversed and the results fed back into the next round. That is to say, the intelligence used to create the attractions could make use of the output of the routing step 921. One or more embodiments carry out an initial placement without attractions to obtain an estimated timing, and then re-iterate on placement using the attractions (using current or previous timings). TDA can thus, if desired, be done outside the physical synthesis flow.

Furthermore, one or more embodiments can support user input; the user can specify known important endpoints (i.e., critical endpoints can, but need not necessarily, come from a timing program). Furthermore, one or more embodiments are re-usable during any placement optimization—not just global placement. For example, one or more embodiments can be used during congestion driven spreading to reduce timing impact.

We have found that focusing solely on the total wirelength produced by a placer (e.g., using HPWL) is not sufficient. One or more embodiments advantageously address the challenging problem of introducing timing information to placement via a flexible approach that can extend to any HPWL-driven placer and any timing estimation technique (of course, as will be appreciated by the skilled artisan, timing estimation requires due care). In one or more embodiments, the TDA placement flow has proven (based on experimental evaluation) to significantly outperform other methods of timing driven placement.

Figure 15:
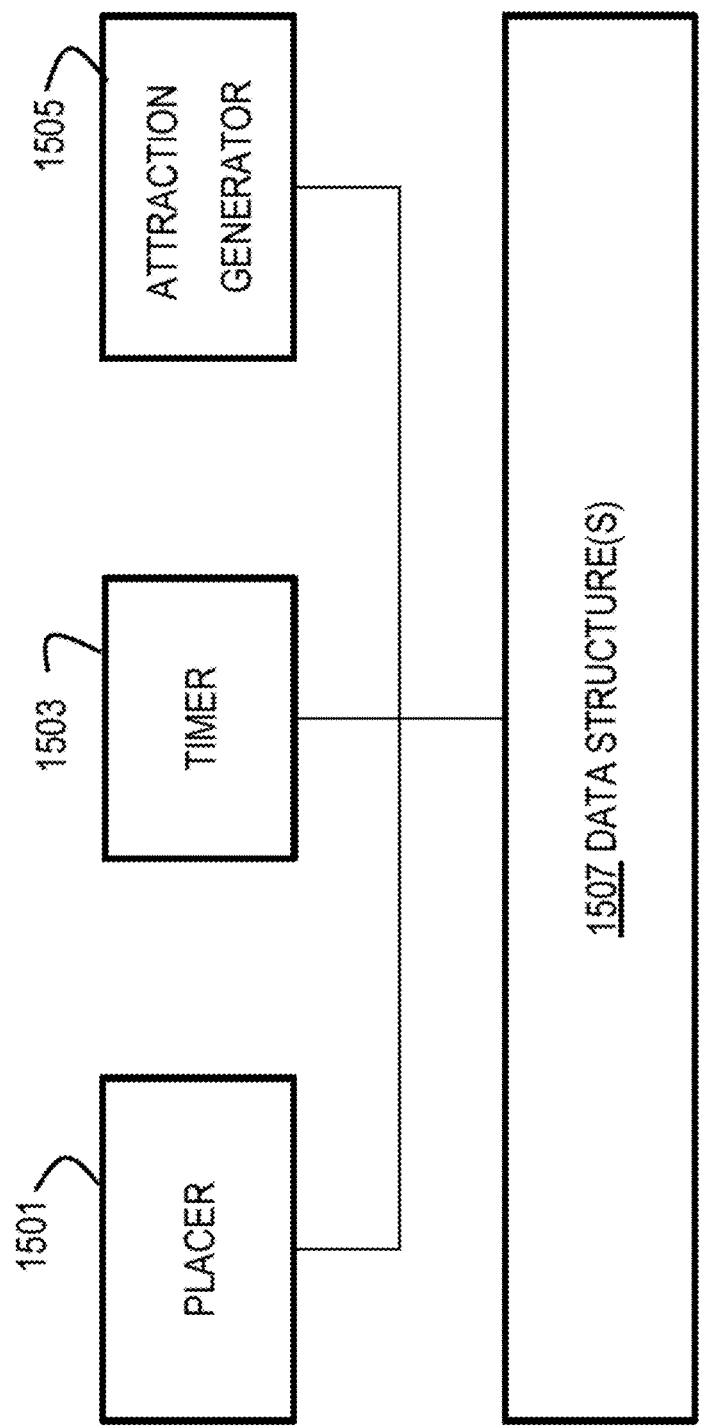
FIG. 15 is a block diagram, in accordance with aspects of the invention.

FIG. 15 shows an exemplary block diagram including placer 1501, timer 1503, attraction generator 1505, and a shared data structure 1507 that permits data communication and sharing between blocks 1501, 1503, and 1505.

Given the discussion thus far, it will be appreciated that an exemplary method for improving the timing performance of electronic circuits designed using electronic design automation, according to an aspect of the invention, includes, at (for example) step 805, carrying out an initial wire-length-driven placement for an integrated circuit design embodied in an unplaced netlist, using a computerized placer 1501, to obtain a data structure representing initial placements of logic gates. Placer 1501 can include a commercially available or academic placer such as one implementing HPWL techniques; it is appropriate that the selected placer permits adding connections that do not necessarily correspond to physical pins of logic gates, in order to allow the creation of the attractions described herein, as discussed further below.

A further step 807 includes identifying at least one timing-critical source-sink path between at least one pair of source-sink endpoints in the data structure representing the initial placements. This step can be carried out, for example, using timer 1503. Non-limiting examples of suitable timers include Cadence Tempus™ (mark of Cadence Design Systems Inc. San Jose, Calif., USA) and Synopsys Primetime® (registered mark of Synopsys, Inc., Mountain View, Calif., USA).

A still further step 809 (see also discussion of FIGS. 4 and 5) includes creating a new pseudo two-pin net ("attraction") for each pair of the at least one pair of source-sink endpoints to create an updated netlist. This can be carried out with attraction generator 1505, which implements logical steps as set forth herein for creating the pseudo-nets.

Yet a further step (repeating step 805 for the updated netlist) includes carrying out a revised wire-length-driven placement on the updated netlist to obtain a data structure representing revised placements. This can be done using placer 1501.

Further comments will now be provided regarding the attractions used in one or more embodiments, and the updated netlists. Conventionally, when people think of a netlist, they think of it as the actual technology gates, wherein, e.g., an AND gate has 2 inputs. In one or more embodiments, when a pseudo two-pin net is added, terminating, for example, at that AND gate, it is not really representing a new signal. Rather, it is a new net purely for the sake of optimizing HPWL-driven placement. In one or more instances, the updated netlist is a modified conventional netlist augmented with the attractions, which are not associated with physical Input/Output (I/O) to the logic gates but rather are provided to enhance the HPWL calculations. The conventional netlist is a representation of actual logic signals. For example, the output of an inverter drives the input of a NAND gate—this relationship is a 2-pin net. The "attractions" according to one or more embodiments of the invention are 2-pin nets that do not represent actual logic signals that exist on the chip but are used in a manner equivalent to such signals by an HPWL-driven placement engine.

Figure 14:
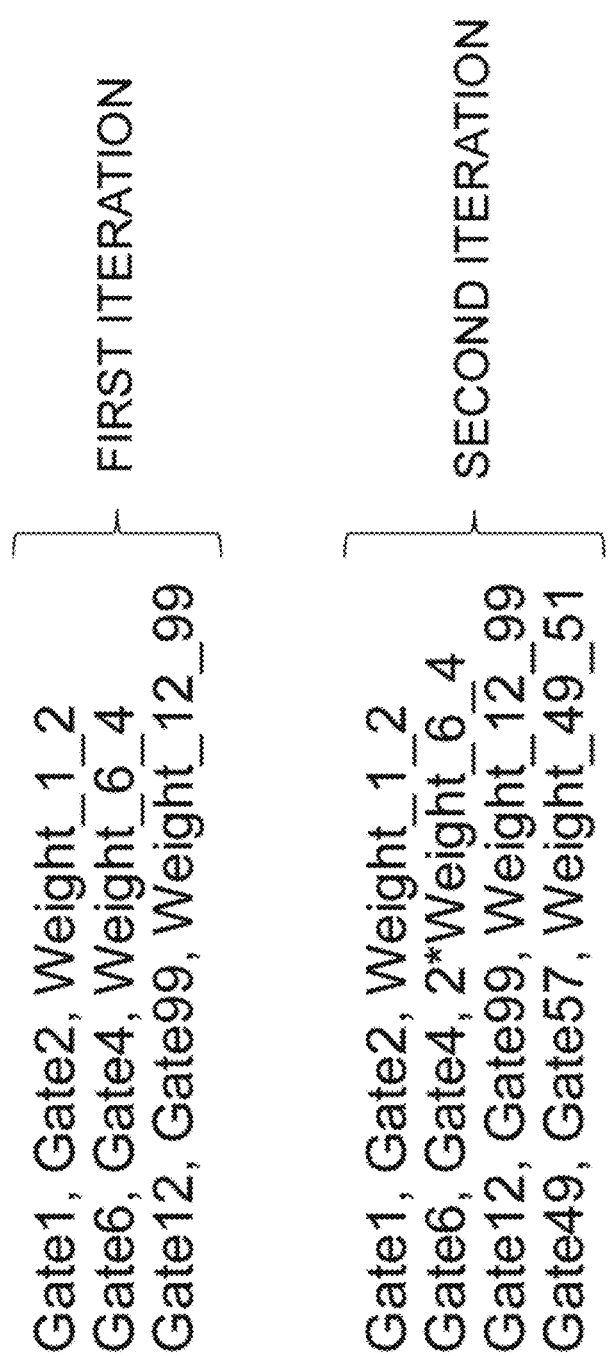
FIG. 14 shows elements of TDAs in a data structure, in accordance with aspects of the invention.

Referring now also to FIG. 14, which depicts an exemplary portion of data structure 1507 of FIG. 15, in one or more embodiments, to create an attraction, create a new connection between two logic gates. The end points of the pseudo-2-pin nets are logic gates, in one or more instances. One or more embodiments assign a weight to the connection. The weight is an attribute (like a label) on the new connection. Existing net(s) can also have such label(s). The notion of weights on nets per se is well-known in placement algorithms. In one exemplary approach, every net, both conventional nets corresponding to physical connections, and nets corresponding to attractions according to aspects of the invention, are assigned a uniform weight. In one or more exemplary embodiments, iterations 811 are carried out, and when step 809 is reached the second time, and an attraction already exists, the weight is increased (rather than making a new attraction, although that could be done in an alternative approach). In some instances, the amount of increase is a user-configurable parameter. One or more embodiments simply increment the weight linearly.

Thus, by way of review, in one or more embodiments, initially, create a two-pin pseudo net by programming into a data structure a connection between two logic gates, using known techniques, and assigning to the connection an initial weight. For example, in FIG. 14, in the first iteration, an attraction with weight "Weight_1_2" is created between Gate1 and Gate2; an attraction with weight "Weight_6_4" is created between Gate6 and Gate4; and an attraction with weight "Weight_12_99" is created between Gate12 and Gate99. In one exemplary embodiment, all the connections are given a uniform weight (i.e., Weight_1_2=Weight_6_4=Weight_12_99). The skilled artisan will be familiar with such unform weighting for conventional representations of actual logic signals, and, given the teachings herein, can assign weights to the inventive "attractions." When step 809 is reached the second time during the iterations (second iteration), the weight is adjusted. When step 807 is repeated the second time, the critical source-sink paths will again be determined. Some pairs of logic gates (say Gate49 and Gate51) did not have an attraction the first time around but are now found to be critical; they get an initial weight Weight_49_51 (can be unity or another value). Some pairs of logic gates were critical the first time and have an attraction and are critical again—say, Gate6 and Gate4—they get an increased weight (say, twice unity or more generally 2*Weight_6_4) (instead of making a second attraction between Gate6 and Gate 4, but that is an alternative approach). Net weighting (for conventional representations of actual logic signals) per se is known to those familiar with HPWL. It is possible to increment by a fixed amount each iteration, or in proportion to the timing criticality of the net in question, or even to refrain from incrementing in some instances. In a simplest approach, weight=w the first time, 2w the second time, 3w the third time, and so on. It is also possible to add only a fraction of the weight, or to give more weight to the connection with worst negative slack, as discussed. Again, the skilled artisan knows how to create a connection between two gates and assign it a weight (for conventional representations of actual logic signals), and, given the teachings herein, can assign weights to the inventive "attractions." Non-limiting examples of known weighting techniques include Chentouf, Mohamed, and Zine El Abidine Alaoui Ismaili, A Novel Net Weighting Algorithm for Power and Timing-Driven Placement, VLSI Design, 2018 Oct. 18; Goplen, Brent, Prashant Saxena, and Sachin Sapatnekar, Net weighting to reduce repeater counts during placement. In Proceedings 42nd Design Automation Conference, 2005, 2005 Jun. 13 (pp. 503-508), IEEE; and Ren, Haoxing, David Zhigang Pan, and David S. Kung, Sensitivity guided net weighting for placement-driven synthesis, IEEE Transactions on Computer-Aided Design of Integrated Circuits and Systems, 2005 Apr. 25; 24(5):711-21. The weights in FIG. 14 thus can be included in data structure 1507 and shared with placer 1501. Since the attractions are pseudo-nets for enhancing placement, physical pins need not be specified.

In one or more embodiments, the at least one timing-critical source sink path includes a plurality of timing-critical source-sink paths and the at least one pair of source-sink endpoints includes a plurality of pairs of source-sink endpoints.

One or more embodiments further include repeating the steps of identifying the plurality of timing-critical source-sink paths, creating the new pseudo two-pin net for each pair of the plurality of pairs of endpoints, and carrying out the revised wire-length-driven placement for a plurality of total iterations. See arrow 811. As used herein, a plurality of total iterations includes a first run plus at least one additional run. Ceasing iterations could be based on, for example, a fixed number of iterations, a criterion for "convergence" (e.g., timing metrics have stopped improving—there are no critical paths left or timing is getting worse on subsequent iterations due to saturation), or after a certain amount of CPU usage, or the like. In a non-limiting example, referring to FIG. 8, there could be eight iterations 909 and four iterations 915.

In one or more embodiments, carrying out the initial wire-length-driven placement and carrying out the revised wire-length-driven placement each include applying a half-perimeter wire length-driven placement, and wherein the computerized placer 1501 includes a half-perimeter wire length-driven computerized placer.

In some cases, identifying the plurality of timing-critical source-sink paths between the pairs of source-sink endpoints in the data structure representing the initial placements includes obtaining input from a human subject matter expert, using a computerized user interface; however, more typically, identifying the plurality of timing-critical source-sink paths between the pairs of source-sink endpoints in the data structure representing the initial placements includes using a computerized timing estimation routine (timer 1503).

In one or more embodiments, using the computerized timing estimation routine includes using the computerized timing estimation routine to obtain results that are relatively accurate among the pairs of source-sink endpoints. As discussed elsewhere herein, "relatively accurate" has a definite meaning in that the pairs of source-sink endpoints are accurately ranked from worst to best, but the actual arrival time/slack values need not necessarily be correct.

Referring to 931 in FIG. 9, in one or more embodiments, carrying out the revised wire-length-driven placement on the updated netlist to obtain the data structure representing revised placements includes moving the pairs of endpoints closer to each other.

In some instances, carrying out the revised wire-length-driven placement on the updated netlist to obtain the data structure representing revised placements includes lowering tortuosity of paths between the pairs of endpoints (seen at both 931 and 933). In some such instances 931, carrying out the revised wire-length-driven placement on the updated netlist to obtain the data structure representing revised placements further includes moving the pairs of endpoints closer to each other.

As shown at 933, in some cases, in carrying out the revised wire-length-driven placement on the updated netlist to obtain the data structure representing revised placements, the pairs of endpoints are fixed relative to each other.

One or more embodiments further include retaining the pseudo two-pin nets during the plurality of total iterations; as per FIG. 14 Weight_1_2 and Weight_12_99 are retained in the second iteration even though not critical in the second iteration.

One or more embodiments further include carrying out logic synthesis 103 to obtain the integrated circuit design embodied in the unplaced netlist, and, subsequent to the plurality of total iterations, carrying out, on a final version of the data structure representing the revised placements, virtual timing optimization 107, clock optimization 109, wire synthesis and optimization 111, and routing 113. The "final version of" the data structure could be, for example, from the penultimate iteration or final iteration—in general, whatever iteration had the best performance.

Referring to FIG. 8 (dotted arrow from 921 back to 905), one or more embodiments further include, based on results of the routing, repeating the steps of identifying the plurality of timing-critical source-sink paths, creating the new pseudo two-pin net for each pair of the pairs of endpoints, and carrying out the revised wire-length-driven placement for a new plurality of total iterations.

Figure 11:
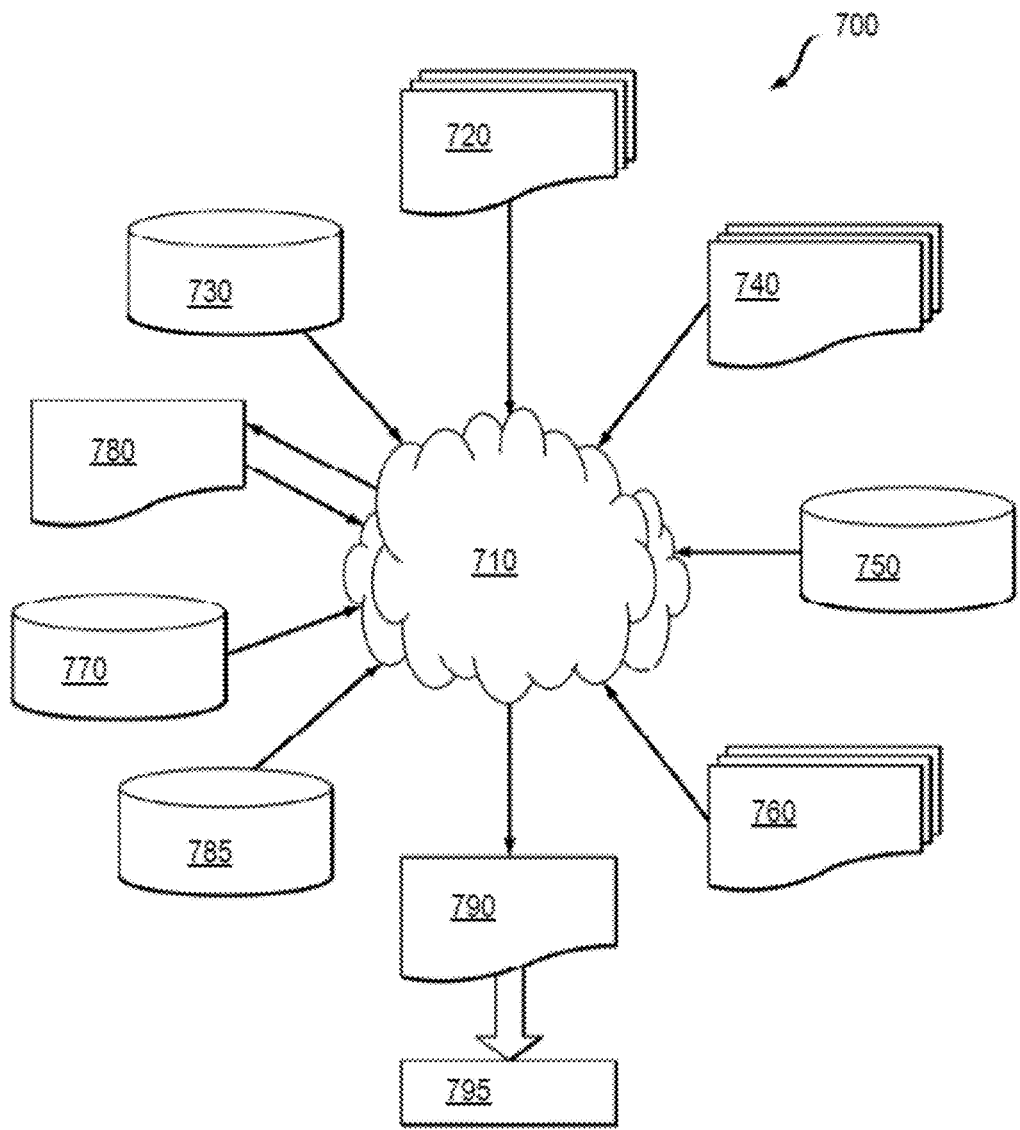
FIG. 11 is a flow diagram of a design process used in semiconductor design, manufacture, and/or test.
Figure 12:
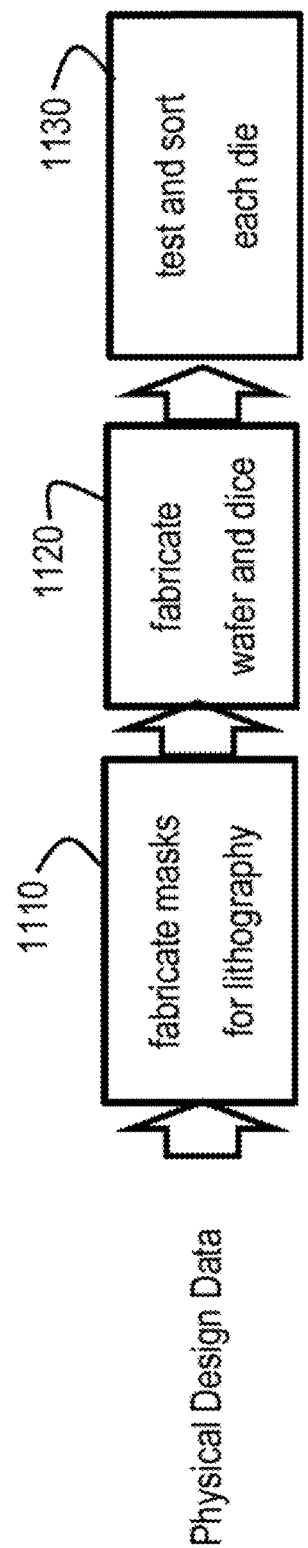
FIG. 12 shows further aspects of IC fabrication from physical design data.
Figure 13:
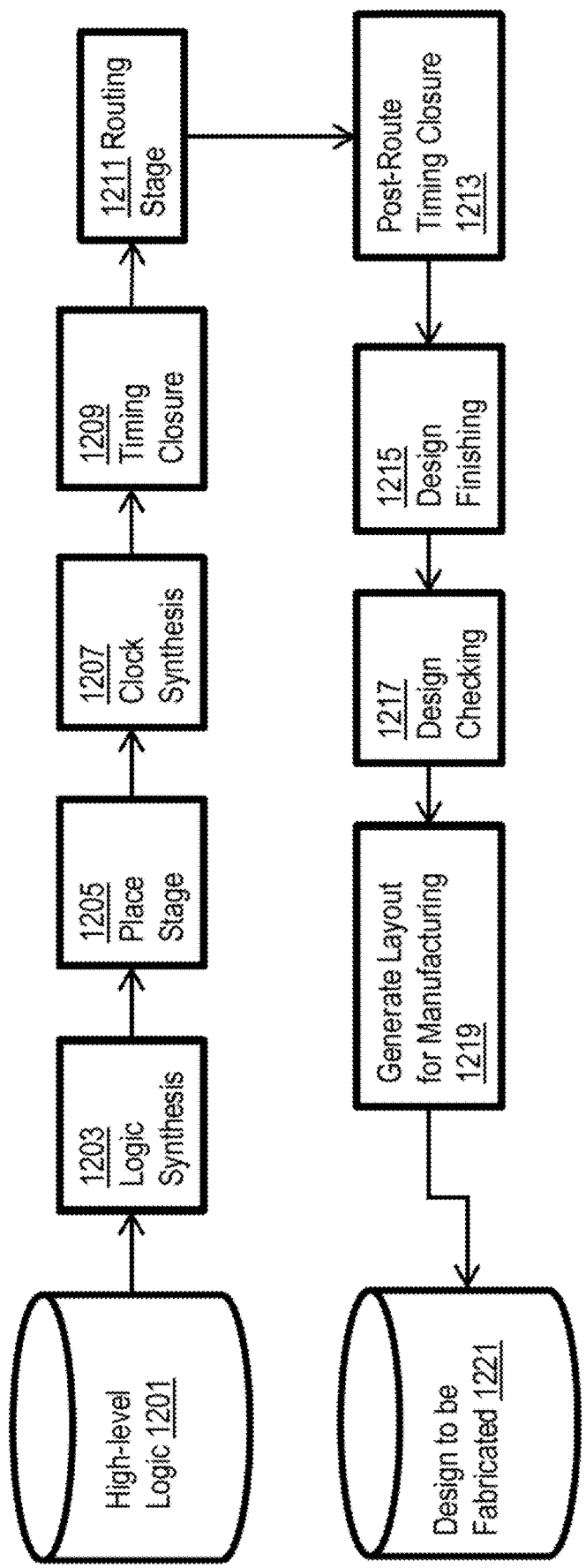
FIG. 13 shows an exemplary high-level Electronic Design Automation (EDA) tool flow, within which aspects of the invention can be employed.

One or more embodiments further include fabricating a physical integrated circuit based on the routing 921; e.g., conclude step 921 and prepare a layout and instantiate the layout as a design structure; the physical integrated circuit can be fabricated in accordance with the design structure. Refer to FIGS. 11-13 discussed elsewhere herein.

One or more embodiments further include, at 911, clustering and fixing memory elements on a final version of the data structure representing the revised placements; and repeating the steps of identifying the plurality of timing-critical source-sink paths, creating the new pseudo two-pin net for each pair of the pairs of endpoints, and carrying out the revised wire-length-driven placement for a new plurality of total iterations subsequent to the clustering and fixing of the memory elements (refer to 915 and note step 913 to clear out the attractions from 907 and 909). Note also 911 includes physical clustering also called clock optimization or clock synthesis.

Consider again "congestion driven" spreading. Placement algorithms are often called in a physical synthesis flow with different objectives than just improving HPWL, but use the placement engine to ensure that HPWL is degraded as little as possible. Employing aspects of the invention in such instances advantageously further enhances those algorithms to degrade timing as little as possible.

Regarding buffering and reasonable metal layer assumptions, timing information at the early stage in physical synthesis flow is typically quite inaccurate. The skilled artisan will appreciate that appropriate steps should be taken to ensure that the critical paths are obtained. Long wires may need to include buffers that repeat and strengthen the signal. The best buffering/repeater solution for long wires cannot be determined until terminal locations are known, but it is not known where the terminals will be until there is some knowledge of the criticality of that particular net. Timing information is desired to carry out placement but to do accurate timing it is necessary to know where things are placed and how they are optimized. This problem is intractable, so time of flight calculations can be performed based on the specific technology, providing an approximation of the delay given the distance between the terminals (source and sink of net) if the connection is properly optimized. If paths are short, they can be left alone. If paths are long, assume some number of buffers are put in. A time-of-flight cost can be estimated for a particular layer of metal. Time of flight includes propagation delay and also delay associated with intermediate buffers/repeating stage(s). The skilled artisan is familiar with problems of doing timing early in the design process when locations of all circuit elements are not known yet, and is aware that assumptions need to be made about inserting buffers and about metal layers. Higher metal layers can use wider wires. Paths that are critical if wired at a low layer may not be critical at all if wired at a high layer. It may be unrealistic to assume that all connections are at a lowest metal layer. Techniques estimate what a router will do, given a 2-pin net (source and sink)—how the router will draw the wires between those terminals and how optimization will decide whether some number of repeaters need to be inserted along that wire. This is a known problem whenever timing is being done early in the design process (virtual timing, timing estimation). Given the teachings herein, the skilled artisan can implement suitable buffering and reasonable metal layer assumptions.

One or more embodiments provide a method for improving the timing performance of electronic circuits designed using electronic design automation, the method including: obtaining, from a computerized placer 1501, results of an initial wire-length-driven placement for an integrated circuit design embodied in an unplaced netlist, the results including a data structure representing initial placements of logic gates; obtaining, from a computerized timer 1503, at least one timing-critical source-sink path between at least one pair of source-sink endpoints in the data structure representing the initial placements; creating (e.g., with generator 1505) a new pseudo two-pin net for each pair of the at least one pair of source-sink endpoints to create an updated netlist; and providing the updated netlist to the computerized placer to facilitate the computerized placer carrying out a revised wire-length-driven placement on the updated netlist to produce a data structure representing revised placements.

In one or more embodiments, a resulting layout is instantiated as a design structure. See discussion of FIG. 11. A physical integrated circuit is then fabricated in accordance with the design structure. See again discussion of FIG. 11. Refer also to FIG. 12. Once the physical design data is obtained, based, in part, on the analytical processes described herein, an integrated circuit designed in accordance therewith can be fabricated according to known processes that are generally described with reference to FIG. 12. Generally, a wafer with multiple copies of the final design is fabricated and cut (i.e., diced) such that each die is one copy of the integrated circuit. At block 1110, the processes include fabricating masks for lithography based on the finalized physical layout. At block 1120, fabricating the wafer includes using the masks to perform photolithography and etching. Once the wafer is diced, testing and sorting each die is performed at 1130 to filter out any faulty die.

Figure 10:
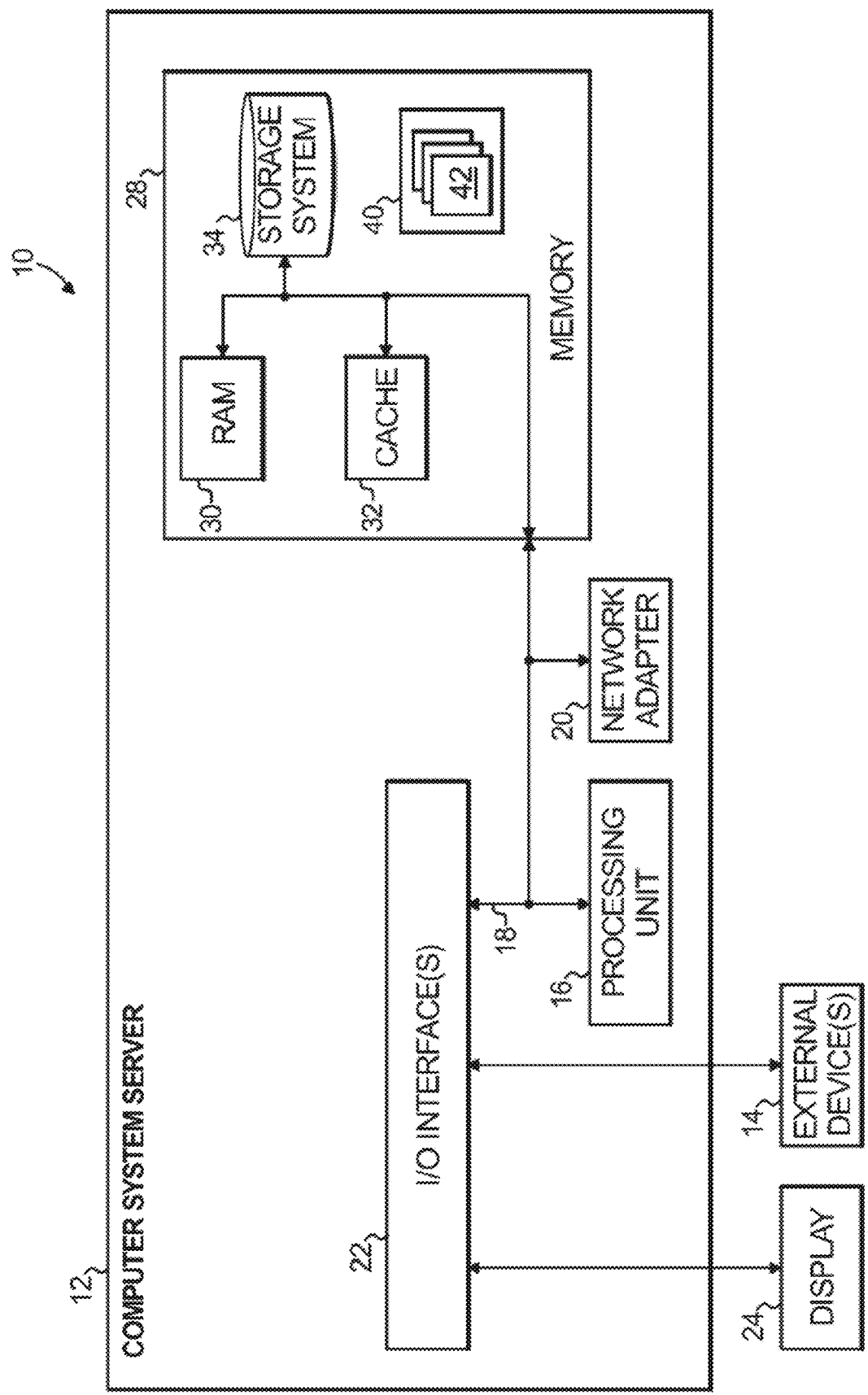
FIG. 10 depicts a computer system that may be useful in implementing one or more aspects and/or elements of the invention.

One or more embodiments include a computer including a memory 28; and at least one processor 16, coupled to the memory, and operative to carry out or otherwise facilitate any one, some, or all of the method steps described herein (as depicted in FIG. 10). In one or more embodiments, the amount of computer resources/CPU time needed during the design cycle, as well as the amount of human design engineer hours, can be reduced using aspects of the invention. Alternatively, with the same resources and design engineer hours, a different and better (in terms of timing performance and the like) chip can be designed.

Furthermore, referring to FIG. 11, in one or more embodiments the at least one processor is operative to generate a design structure for the circuit design, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure. The physical integrated circuit will be improved (for example, because of enhanced placement/timing performance, as compared to designs not using aspects of the invention for EDA).

FIG. 13 depicts an example high-level Electronic Design Automation (EDA) tool flow, which is responsible for creating an optimized microprocessor (or other IC) design to be manufactured. A designer could start with a high-level logic description 1201 of the circuit (e.g., VHDL or Verilog). The logic synthesis tool 1203 compiles the logic, and optimizes it without any sense of its physical representation, and with estimated timing information. The placement tool 1205 takes the logical description and places each component, looking to minimize congestion in each area of the design. The clock synthesis tool 1207 optimizes the clock tree network by cloning/balancing/buffering the latches or registers. The timing closure step 1209 performs a number of optimizations on the design, including buffering, wire tuning, and circuit repowering; its goal is to produce a design which is routable, without timing violations, and without excess power consumption. The routing stage 1211 takes the placed/optimized design, and determines how to create wires to connect all of the components, without causing manufacturing violations. Post-route timing closure 1213 performs another set of optimizations to resolve any violations that are remaining after the routing. Design finishing 1215 then adds extra metal shapes to the netlist, to conform with manufacturing requirements. The checking steps 1217 analyze whether the design is violating any requirements such as manufacturing, timing, power, electromigration (e.g., using techniques disclosed herein) or noise. When the design is clean, the final step 1219 is to generate a layout for the design, representing all the shapes to be fabricated in the design to be fabricated 1221.

One or more embodiments of the invention, or elements thereof, can be implemented in the form of an apparatus including a memory and at least one processor that is coupled to the memory and operative to perform exemplary method steps. FIG. 10 depicts a computer system that may be useful in implementing one or more aspects and/or elements of the invention; it is referred to herein as a cloud computing node but is also representative of a server, general purpose-computer, etc. which may be provided in a cloud or locally.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 10, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/ output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 10) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described (e.g., in FIG. 15). The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary Design Process Used in Semiconductor Design, Manufacture, and/or Test

One or more embodiments integrate the TDA techniques herein with semiconductor integrated circuit design simulation, test, layout, and/or manufacture. In this regard, FIG. 11 shows a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of design structures and/or devices, such as those that can be analyzed using techniques disclosed herein or the like. The design structures processed and/or generated by design flow 700 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 11 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a gate array or storage medium or the like, design structure 720 may be accessed and processed by one or more hardware and/or software modules within design process 710 to simulate or otherwise functionally represent an electronic component, circuit, electronic or logic module, apparatus, device, or system. As such, design structure 720 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of components, circuits, devices, or logic structures to generate a Netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 710 may include hardware and software modules for processing a variety of input data structure types including Netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc. Path-based timing driven placement using iterative pseudo netlist changes can be performed as described herein.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 790 may comprise a compiled, executable HDL simulation model that functionally simulates the devices to be analyzed.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 790 may then proceed to a stage 795 where, for example, design structure 790: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving the timing performance of electronic circuits designed using electronic design automation, the method comprising:
    carrying out an initial wire-length-driven placement for an integrated circuit design embodied in an unplaced netlist, using a computerized placer, to obtain a data structure representing initial placements of logic gates;
    identifying at least one timing-critical source-sink path between at least one pair of source-sink endpoints in said data structure representing said initial placements;
    creating a new pseudo two-pin net, the new pseudo two-pin net lacking a corresponding electrical signal in the electronic circuit, for each pair of said at least one pair of source-sink endpoints to create an updated netlist; and
    carrying out a revised wire-length-driven placement on said updated netlist to obtain a data structure representing revised placements.

2. The method of claim 1, wherein said at least one timing-critical source sink path comprises a plurality of timing-critical source-sink paths and said at least one pair of source-sink endpoints comprises a plurality of pairs of source-sink endpoints.

3. The method of claim 2, further comprising identifying at least one timing-critical source-sink path between at least one pair of source-sink endpoints in said data structure based on the revised placement, creating at least one new pseudo two-pin net for each pair of said plurality of pairs of endpoints identified based on the revised placement, and repeating said step of carrying out said revised wire-length-driven placement using said at least one new pseudo two-pin net.

4. The method of claim 3, wherein carrying out said initial wire-length-driven placement and carrying out said revised wire-length-driven placement each comprise applying a half-perimeter wire length-driven placement, and wherein said computerized placer comprises a half-perimeter wire length-driven computerized placer.

5. The method of claim 3, wherein identifying said plurality of timing-critical source-sink paths between said pairs of source-sink endpoints in said data structure representing said initial placements comprises obtaining input from a human subject matter expert, using a computerized user interface.

6. The method of claim 3, wherein identifying said plurality of timing-critical source-sink paths between said pairs of source-sink endpoints in said data structure representing said initial placements comprises using a computerized timing estimation routine.

7. The method of claim 6, wherein using said computerized timing estimation routine comprises using said computerized timing estimation routine to obtain results that are relatively accurate among said pairs of source-sink endpoints.

8. The method of claim 3, wherein carrying out said revised wire-length-driven placement on said updated netlist to obtain said data structure representing revised placements comprises moving said pairs of endpoints closer to each other.

9. The method of claim 3, wherein carrying out said revised wire-length-driven placement on said updated netlist to obtain said data structure representing revised placements comprises lowering tortuosity of paths between said pairs of endpoints.

10. The method of claim 9, wherein carrying out said revised wire-length-driven placement on said updated netlist to obtain said data structure representing revised placements further comprises moving said pairs of endpoints closer to each other.

11. The method of claim 9, wherein, in carrying out said revised wire-length-driven placement on said updated netlist to obtain said data structure representing revised placements, said pairs of endpoints are fixed relative to each other.

12. The method of claim 3, further comprising retaining said pseudo two-pin nets during said plurality of total iterations.

13. The method of claim 3, further comprising:
carrying out logic synthesis to obtain said integrated circuit design embodied in said unplaced netlist; and
subsequent to said plurality of total iterations, carrying out, on a final version of said data structure representing said revised placements, virtual timing optimization, clock optimization, wire synthesis and optimization, and routing.

14. The method of claim 13, further comprising:
based on results of said routing, repeating said steps of identifying said plurality of timing-critical source-sink paths, creating said new pseudo two-pin net for each pair of said pairs of endpoints, and carrying out said revised wire-length-driven placement for a new plurality of total iterations.

15. The method of claim 13, further comprising fabricating a physical integrated circuit based on said routing.

16. The method of claim 3, further comprising:
clustering and fixing memory elements on a final version of said data structure representing said revised placements;
carrying out a further revised wire-length-driven placement based on said clustering and fixing; and
repeating said steps of identifying said plurality of timing-critical source-sink paths, creating said new pseudo two-pin net for each pair of said pairs of endpoints, and carrying out said revised wire-length-driven placement for a new plurality of total iterations subsequent to said further revised wire-length-driven placement based on said clustering and fixing.

17. A computer comprising:
a memory; and
at least one processor, coupled to said memory, and operative to improve the timing performance of electronic circuits designed using electronic design automation by:
carrying out an initial wire-length-driven placement for an integrated circuit design embodied in an unplaced netlist, using a computerized placer, to obtain a data structure representing initial placements of logic gates;
identifying at least one timing-critical source-sink path between at least one pair of source-sink endpoints in said data structure representing said initial placements;
creating a new pseudo two-pin net, the new pseudo two-pin net lacking a corresponding electrical signal in the electronic circuit, for each pair of said at least one pair of source-sink endpoints to create an updated netlist; and
carrying out a revised wire-length-driven placement on said updated netlist to obtain a data structure representing revised placements.

18. The computer of claim 17, wherein said at least one timing-critical source sink path comprises a plurality of timing-critical source-sink paths and said at least one pair of source-sink endpoints comprises a plurality of pairs of source-sink endpoints, and where said at least one processor is further operative to repeat said steps of identifying said plurality of timing-critical source-sink paths, creating said new pseudo two-pin net for each pair of said plurality of pairs of endpoints, and carrying out said revised wire-length-driven placement for a plurality of total iterations.

19. The computer of claim 18, wherein said at least one processor is further operative to:
subsequent to said plurality of total iterations, carry out, on a final version of said data structure representing said revised placements, virtual timing optimization, clock optimization, wire synthesis and optimization, and routing; and
prepare a layout based on said routing;
instantiate said layout as a design structure; and
provide said design structure to fabrication equipment to facilitate fabrication of a physical integrated circuit in accordance with said design structure.

20. A computer program product comprising one or more computer readable storage media having stored thereon:
first program instructions executable by a computer system to cause the computer system to carry out an initial wire-length-driven placement for an integrated circuit design embodied in an unplaced netlist, using a computerized placer, to obtain a data structure representing initial placements of logic gates;
second program instructions executable by the computer system to cause the computer system to identify at least one timing-critical source-sink path between at least one pair of source-sink endpoints in said data structure representing said initial placements;
third program instructions executable by the computer system to cause the computer system to create a new pseudo two-pin net, the new pseudo two-pin net lacking a corresponding electrical signal in the electronic circuit, for each pair of said at least one pair of source-sink endpoints to create an updated netlist; and
fourth program instructions executable by the computer system to cause the computer system to carry out a revised wire-length-driven placement on said updated netlist to obtain a data structure representing revised placements.

21. The computer program product of claim 20, wherein said at least one timing-critical source sink path comprises a plurality of timing-critical source-sink paths and said at least one pair of source-sink endpoints comprises a plurality of pairs of source-sink endpoints, further comprising fifth program instructions executable by the computer system to cause the computer system to repeat said steps of identifying said plurality of timing-critical source-sink paths, creating said new pseudo two-pin net for each pair of said plurality of pairs of endpoints, and carrying out said revised wire-length-driven placement for a plurality of total iterations.

22. The computer program product of claim 21, further comprising:
   sixth program instructions executable by the computer system to cause the computer system to, subsequent to said plurality of total iterations, carry out, on a final version of said data structure representing said revised placements, virtual timing optimization, clock optimization, wire synthesis and optimization, and routing; and
   seventh program instructions executable by the computer system to cause the computer system to prepare a layout based on said routing;
   eighth program instructions executable by the computer system to cause the computer system to instantiate said layout as a design structure; and
   ninth program instructions executable by the computer system to cause the computer system to provide said design structure to fabrication equipment to facilitate fabrication of a physical integrated circuit in accordance with said design structure.

23. A method for improving the timing performance of electronic circuits designed using electronic design automation, the method comprising:
   obtaining, from a computerized placer, results of an initial wire-length-driven placement for an integrated circuit design embodied in an unplaced netlist, said results comprising a data structure representing initial placements of logic gates;
   obtaining, from a computerized timer, at least one timing-critical source-sink path between at least one pair of source-sink endpoints in said data structure representing said initial placements;
   creating a new pseudo two-pin net, the new pseudo two-pin net lacking a corresponding electrical signal in the electronic circuit, for each pair of said at least one pair of source-sink endpoints to create an updated netlist; and
   providing said updated netlist to said computerized placer to facilitate said computerized placer carrying out a revised wire-length-driven placement on said updated netlist to produce a data structure representing revised placements.

24. The method of claim 23, wherein said at least one timing-critical source sink path comprises a plurality of timing-critical source-sink paths and said at least one pair of source-sink endpoints comprises a plurality of pairs of source-sink endpoints.

25. The method of claim 24, further comprising repeating said steps of obtaining said plurality of timing-critical source-sink paths, creating said new pseudo two-pin net for each pair of said plurality of pairs of endpoints, and providing said updated netlist for a plurality of total iterations.

* * * * *